(12) United States Patent
Gilgen et al.

(10) Patent No.: US 7,761,852 B2
(45) Date of Patent: Jul. 20, 2010

(54) FAST DETECTION OF THE ORIGINS OF MEMORY LEAKS WHEN USING POOLED RESOURCES

(75) Inventors: David B. Gilgen, Raleigh, NC (US); William D. Wigger, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 2027 days.

(21) Appl. No.: 10/723,979

(22) Filed: Nov. 26, 2003

(65) Prior Publication Data

US 2005/0114843 A1 May 26, 2005

(51) Int. Cl.
G06F 9/44 (2006.01)

(52) U.S. Cl. .................................. 717/127

(58) Field of Classification Search ......... 717/124–129, 717/147–152, 100, 105, 5–6
See application file for complete search history.

(56) References Cited

U.S. PATENT DOCUMENTS

| | | | | |
|---|---|---|---|---|
| 5,335,353 | A * | 8/1994 | Cizek et al. | 455/17 |
| 5,442,634 | A * | 8/1995 | Cizek | 370/329 |
| 5,590,329 | A | 12/1996 | Goodnow, II et al. | |
| 5,689,707 | A * | 11/1997 | Donnelly | 707/206 |
| 5,699,536 | A * | 12/1997 | Hopkins et al. | 712/216 |
| 6,085,029 | A | 7/2000 | Kolawa et al. | |
| 6,167,535 | A | 12/2000 | Foote et al. | |
| 6,370,684 | B1 | 4/2002 | De Pauw et al. | |
| 6,597,907 | B1 * | 7/2003 | Pruitt et al. | 455/423 |
| 6,625,808 | B1 * | 9/2003 | Tarditi | 717/154 |
| 2002/0116383 | A1 * | 8/2002 | Wollrath et al. | 707/10 |
| 2002/0120640 | A1 | 8/2002 | Hills | |
| 2004/0088614 | A1 * | 5/2004 | Wu | 714/718 |
| 2004/0133895 | A1 * | 7/2004 | Dahlstedt et al. | 719/310 |
| 2004/0172579 | A1 * | 9/2004 | Fu | 714/47 |

OTHER PUBLICATIONS

Bernhard Scholz el at. "Symbolic Pointer Analysis for Detecting Memory Leaks", Nov. 1999, ACM Press, vol. 34, Issue 11, pp. 104-113.*

(Continued)

*Primary Examiner*—Anna Deng
(74) *Attorney, Agent, or Firm*—Jeanine S. Ray-Yarietts, Esq.; Steven M. Greenberg, Esq.; Carey, Rodriguez, Greenberg & Paul, LLP

(57) ABSTRACT

The present invention is a method, system and apparatus for memory leak detection and reporting. In a preferred method of the invention, allocated ones of resources in a resource pool can be time stamped upon allocation and calling code segments receiving the allocated resources can be identified. Memory leaks can be detected by inspecting individual timestamps for the allocated resources to determine whether the allocated resources have become overly idle. Notably, the identifying step can include the step of retrieving identities for individual ones of the calling code segments from an associated calling stack when the individual ones of the calling code segments acquire one of the allocated resources. In any case, for each allocated resource determined to have become overly idle, an identity of a corresponding one of the calling code segments can be reported.

20 Claims, 2 Drawing Sheets

OTHER PUBLICATIONS

Martin Hirzel et al. "On the Usefulness of Type and Liveness Accuracy for Garbage Collection and Leak Detection", Nov. 2002, ACM Press, vol. 24, Issue 6, pp. 595-623.*

Hirzel, Martin et al., *On the Usefulness of Type and Liveness Accuracy for Garbage Collection and Leak Detection*, ACM Transactions on Programming Languages and Systems, vol. 24, No. 6, Nov. 2002.

Heine, David L., *A Practical Flow-Sensitive and Context-Sensitive C and C++ Memory Leak Detector*, Computer Systems Laboratory, Stanford University, Jun. 2003.

Scholz, Bernhard, *Symbolic Pointer Analysis for Detecting Memory Leaks*, ACM, 2000.

* cited by examiner

FAST DETECTION OF THE ORIGINS OF MEMORY LEAKS WHEN USING POOLED RESOURCES

BACKGROUND OF THE INVENTION

1. Statement of the Technical Field

The present invention relates to the field of memory leak detection and remediation and more particularly to the location of memory leak origins.

2. Description of the Related Art

Memory leakage has confounded software developers for decades resulting in the sometimes global distribution of bug-ridden, crash-prone software applications. Particularly in respect to those programming languages which permitted the manual allocation of memory, but also required the manual de-allocation of allocated memory, memory leakage has proven to be the principal run-time bug most addressed during the software development cycle. So prevalent a problem has memory leakage become, entire software development tools have been developed and marketed solely to address the memory leakage problem.

Memory leakage, broadly defined, is the gradual loss of allocable memory due to the failure to de-allocate previously allocated, but no longer utilized memory. Typically, memory can be reserved for data having a brief lifespan. Once the lifespan has completed, the reserved memory ought to be returned to the pool of allocable memory so that the reserved memory can be used at a subsequent time as necessary. Importantly, where memory leakage persists without remediation, ultimately not enough memory will remain to accommodate the needs of other processes.

Recognizing the importance of addressing the memory leakage problem, computer programming language theorists have developed the notion of garbage collection. Garbage collection refers to the automated analysis of allocated memory to identify regions of allocated memory containing data which no longer are required for the operation of associated processes. In the context of object oriented programming languages such as the Java™ programming language, when objects residing in memory are no longer accessible within a corresponding application, the memory allocated to the "dead" object can be returned to the pool of allocable memory.

Even within a garbage collection system, memory leaks can easily occur when a layer of code has been written to pool a set of computing resources. By pooling resources, a section of the code always will maintain a reference to a computing resource within the pool represented within memory, even when the resource no longer is useful and ought to be garbage collected. Yet, often rogue code retrieves an object from the pool without subsequently returning the object when the object is no longer required by the rogue code. As a result, a memory leak can arise as the reference to the object in the pool remains intact though the object no longer practically exists in the pool.

Whereas memory leak detection can be problematic generally, in an autonomic system, the problem can be particularly acute. For the uninitiated, autonomic computing systems self-regulate, self-repair and respond to changing conditions, without requiring any conscious effort on the part of the computing system operator. To that end, the computing system itself can bear the responsibility of coping with its own complexity. The crux of autonomic computing relates to eight principal characteristics:

I. The system must "know itself" and include those system components which also possess a system identify.

II. The system must be able to configure and reconfigure itself under varying and unpredictable conditions.

III. The system must never settle for the status quo and the system must always look for ways to optimize its workings.

IV. The system must be self-healing and capable of recovering from routine and extraordinary events that might cause some of its parts to malfunction.

V. The system must be an expert in self-protection.

VI. The system must know its environment and the context surrounding its activity, and act accordingly.

VII. The system must adhere to open standards.

VIII. The system must anticipate the optimized resources needed while keeping its complexity hidden from the user.

Thus, in keeping with the principles of autonomic computing, not only will memory leak detection be important, but also the determination of the origin of a memory leak can be imperative to the autonomic detection of memory leaks.

SUMMARY OF THE INVENTION

The present invention addresses the deficiencies of the art in respect to memory management and leak detection and provides a novel and non-obvious method, system and apparatus for memory leak and memory leak origin detection and reporting. In a preferred aspect of the invention, a memory leak detection and reporting method can include time stamping allocated ones of resources in a resource pool and identifying calling code segments receiving the allocated resources. Memory leaks can be detected by inspecting individual timestamps for the allocated resources to determine whether the allocated resources have become overly idle. Notably, the identifying step can include the step of retrieving identities for individual ones of the calling code segments from an associated calling stack when the individual ones of the calling code segments acquire one of the allocated resources.

In any case, for each allocated resource determined to have become overly idle, an identity of a corresponding one of the calling code segments can be reported. Importantly, each of the detecting and reporting steps can be performed in a separate thread of execution. Alternatively, each of the detecting and reporting steps can be performed in a pool manager. In this regard, each of the detecting and reporting steps can be performed responsive to allocating one of the resources in the resource pool. As yet another alternative, however, each of the detecting and reporting steps can be performed responsive to an elapsing interval.

The method of the invention can be performed in a memory leak detection and reporting system. In a preferred aspect of the invention, the system can include a resource pool having one or more allocable resources. A pool manager also can be included and the pool manager can be programmed to manage allocation of the allocable resources to calling code segments. Finally, a data store of allocated resources and corresponding identities for calling code segments receiving the allocated resources can be included in the system of the invention. Significantly, the pool manager can include a communicative coupling to a call stack and correlation logic for correlating a calling code segment reference disposed in the call stack to a concurrently allocated one of the allocable resources. Also, a garbage collector can be coupled to the resource pool.

In a specific aspect of the invention, a memory leak detection and reporting method can include the step of allocating a resource from a resource pool, time stamping the allocated resource and recording an identity for a calling code segment acquiring the allocated resource. The time stamp subsequently can be updated when the allocated resource is accessed. During a validation process, the time stamp can be inspected to determine if the allocated resource has become overly idle. If it is determined that the allocated resource has become overly idle, a suspected memory leak in association with the allocated resource can be reported as can the recorded identity for the calling code segment which had acquired the allocated resource.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for autonomically detecting both memory leaks, and also the origin of memory leaks in connection with the allocation of resources from a resource pool. In accordance with the present invention, a resource pool management process can timestamp resources as those resources are allocated to requesting code segments. The resource pool management process further can identify the requesting code segments and the resource pool management process yet further can maintain a reference to each allocated resource. Subsequently, the resource pool management process can query each allocated resource through the maintained reference to determine whether the allocated resource has become unduly idle. If so, it can be determined that a memory leak may have occurred and the corresponding code segment which had requested the idle resource can be identified as the origin of the memory leak.

Figure 1:
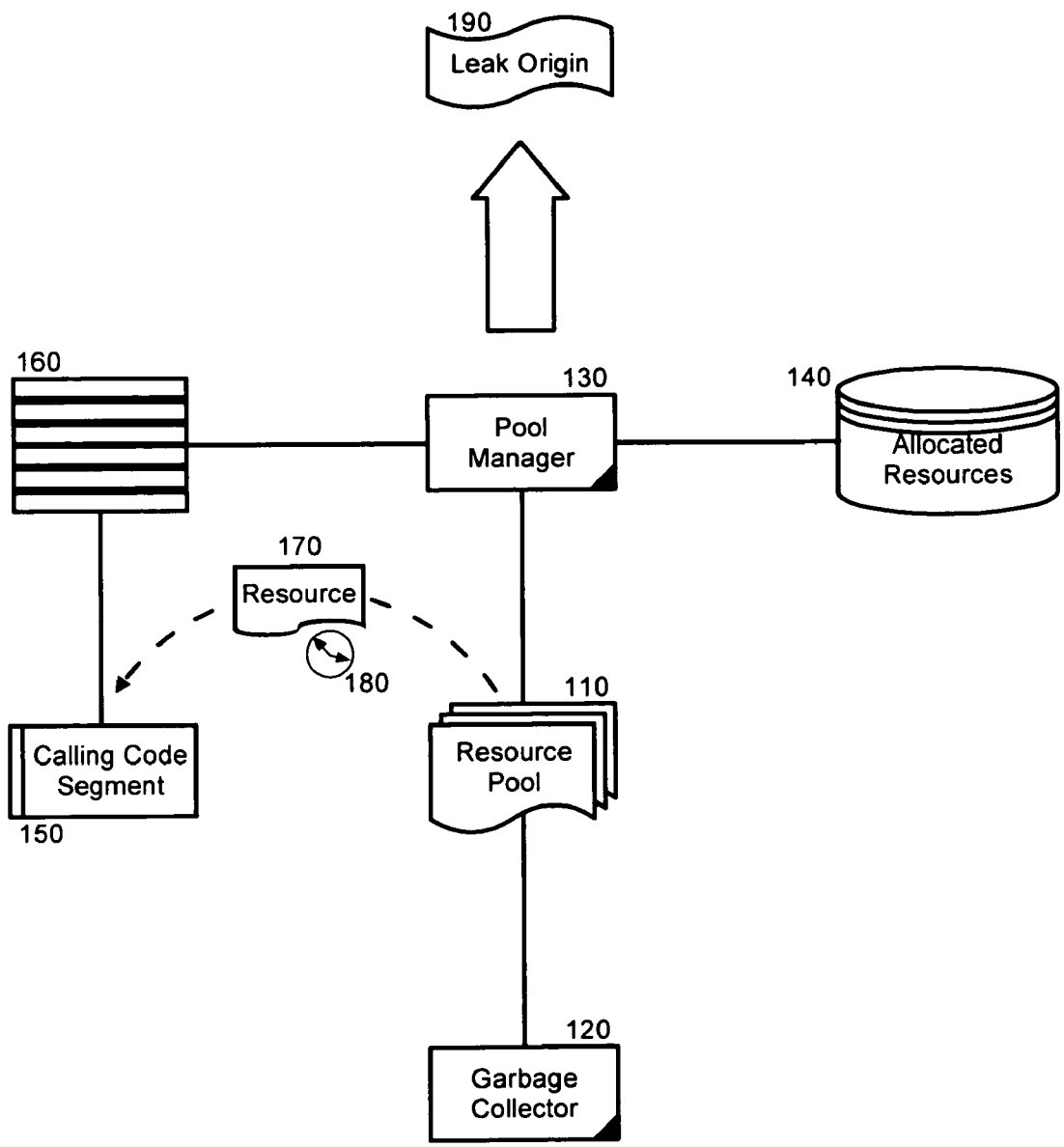
FIG. 1 is a schematic illustration of an autonomic memory leak detection system for use with a resource pool; and, FIG. 2 is a flow chart illustrating a process for detecting memory leaks and the origin of memory leaks arising from unused objects in a resource pool.

In more particular illustration, FIG. 1 depicts an autonomic memory leak detection system for use with a resource pool in accordance with the present invention. The system can include a pool manager 130 coupled to a resource pool 110 configured to allocate idle resources to requesting code segments. In this regard, the resources in the resource pool 110 can include any allocable process which can range from a communications socket to data processing logic. The requesting code segments, by comparison, can include any executable or interpretable logic such as a calling method in an object.

In any case, calling code segments can request the use of individual resources from the resource pool 110. The calling code segments can utilize the allocated resources and, subsequently, the calling code segments can return the allocated resources to the resource pool 110 so that other calling code segments can utilize the now de-allocated resource. Optionally, the resource pool 110 can be coupled to a garbage collector 120 configured to free memory occupied by resources in the resource pool 110 which have become unduly idle and which no longer are considered necessary to reside in the resource pool 110.

The pool manager 130 also can be coupled both to a data store of allocated resources 140 and also to a call stack 160 associated with one or more calling code segments in the system. The data store of allocated resources 140 can include a listing of all resources in the resource pool 110 which have been allocated previously to calling code segments, but which have yet to be returned to the resource pool 110 by the calling code segments. Each entry in the listing can include the identity of a corresponding calling code segment, in the form of an object identity, method name, segment line number, or other such similar identify mechanism.

Notably, the pool manager 130 can retrieve the identity of a calling code segment from the call stack 160 which can record such identity when the calling code segment requests a pool resource from the resource pool 110. Specifically, in a preferred aspect of the invention, a placebo error can be generated by intentionally throwing an exception in close proximity in the calling code segment to the function call to request a pool resource from the resource pool 110. By throwing an exception, the precise object identity, method name and segment line number can be retrieved from the exception data which can be taken from the call stack 160.

In operation, when a calling code segment 150 requests the allocation of a resource 170 from the resource pool 110, the pool manager 130 can locate the requested resource 170 and the pool manager 130 can append to the resource 170 with a time stamp 180 to indicate the time when the resource 170 had been allocated. The pool manager 130 can pass the resource 170 with time stamp 180 to the calling code segment, though the pool manager 130 can retain a reference to the resource 170. During the allocation process, the pool manager 130 further can inspect the call stack 160 to identify the calling code segment 150. Finally, the pool manager 130 can write a record to the data store of allocated resources 140 containing the identity both of the allocated resource 170 and the calling code segment 150.

Periodically, the pool manager 130 can validate each allocated resource to determine whether the resource allocations remain valid, or whether any one or more of the resource allocations have become overly idle. In this regard, the pool manager 130 can traverse the data store of allocated resources 140. For each allocated resource, including the resource 170, the pool manager 130 can query the resource 170 to inspect the time stamp 180. When too much time has elapsed without the resource 170 having been accessed by the calling code segment 150, the resource 170 will have been presumed to have become overly and intolerably idle. Yet, as the calling code segment 150 had not returned the resource 150 to the resource pool 110, it further will be presumed that a memory leak has arisen. Consequently, to facilitate the remediation of the memory leak, a report 190 of the memory leak detection can be generated along with the identity of the calling code segment.

Notably, the foregoing validation process can be performed on a periodic schedule by the pool manager 130. Alternatively, a separate thread of execution can be spawned to independently validate the allocated resources irrespective of the operation of the pool manager 130. In a preferred embodiment, however, the pool manager 130 can perform the validation each time a resource allocation request is received and processed in the pool manager 130. It will further be recognized by the skilled artisan that the report 190 can be processed manually through the human identification of the source of the suspected memory leak, or the report 190 can be processed automatically through the computer identification of the source of the suspected memory leak.

Figure 2:
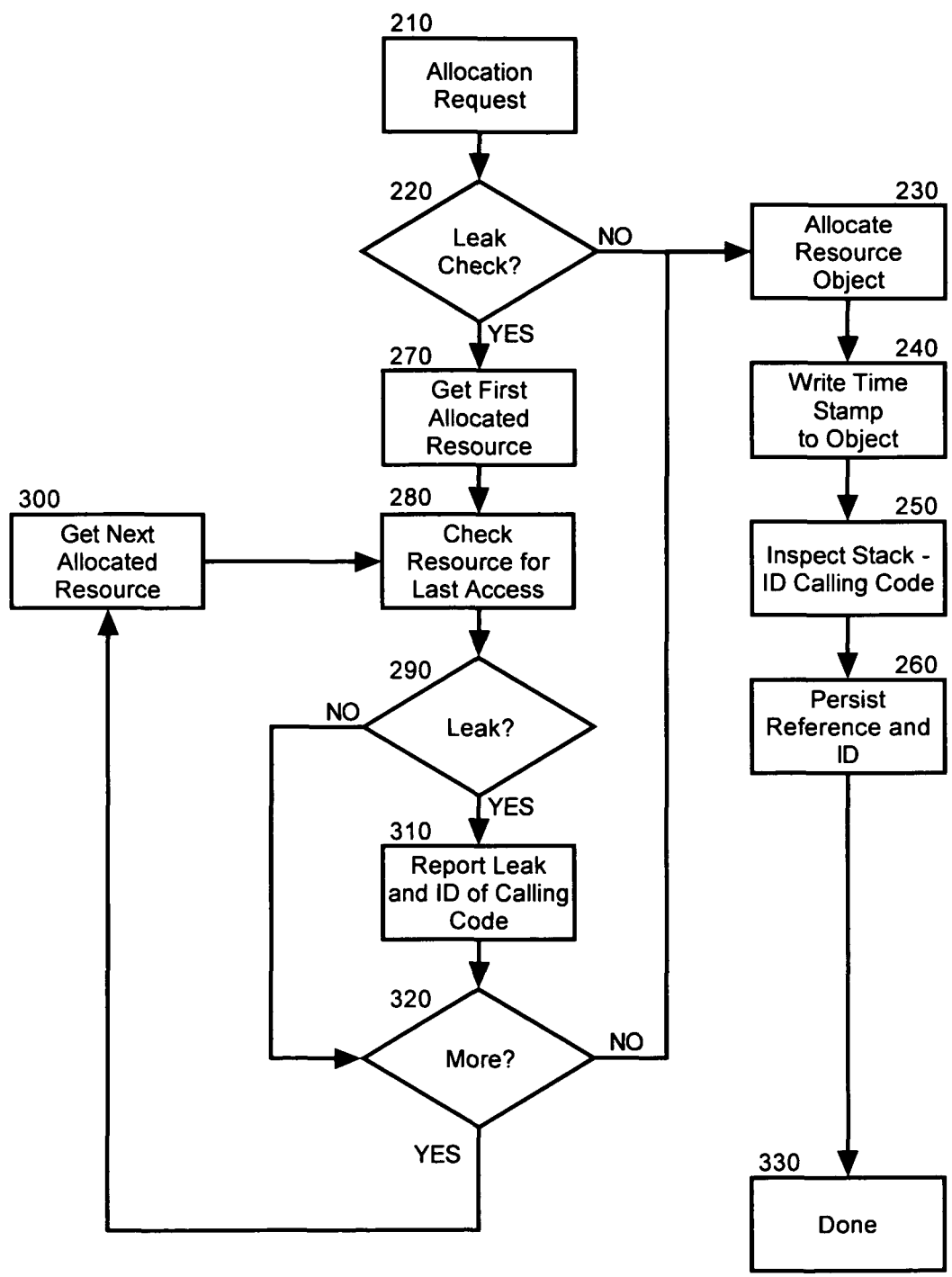

To better illustrate the principle of the preferred embodiment of the present invention, FIG. 2 is a flow chart illustrating a process for detecting memory leaks and the origin of memory leaks arising from unused objects in a resource pool. Beginning in block 210, an allocation request can be received for processing. In decision block 220, it initially can be determined whether a memory leak check will be required. That is, where not enough time has elapsed since the last validation exercise, no leak check will be required. Where no leak check will be required, in block 230 the requested resource can be allocated. Also, in block 240 a time stamp can be written to the requested resource. Importantly, in block 250 the call stack can be inspected to identify the calling code segment receiving the requested resource. Finally, in block 260, a reference to the requested resource and the identity of the calling code segment can be persisted for subsequent use.

Notably, whenever an allocated resource is accessed, the allocated resource can update its own time stamp to reflect the last time when the allocated resource had been allocated. In this way, when a leak check is required, overly idle resources can be detected. Specifically, once a leak check is determined to be required, in block 270 the first allocated resource which had been previously persisted can be retrieved and in block 280, the resource can be checked to determine when the resource had last been accessed. If in decision block 290 the time stamp of the resource indicates an overly idle resource, a memory leak can be presumed. Otherwise, the next allocated resource can be retrieved in block 300 and the process can repeat there for in blocks 280 through 330.

When a memory leak is detected in decision block 290, the identity of the calling code segment associated with the resource under study can be retrieved and a notification can be created in block 310 specifying the detection of a memory leak and the origin of the memory leak. Based upon this report, a manually intervening developer can pinpoint the offending code segment and can take remedial actions accordingly. In any case, in decision block 320, of additional allocated resources remain to be validated, in block 300 the next allocated resource can be retrieved in block 300 and the process can repeat there for in blocks 280 through 330. Otherwise, the process can continue in blocks 230 through 260 in which the resource object can be allocated before the process can end in block 330.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A memory leak detection and reporting method comprising the steps performed by a processor of:
   time stamping allocated ones of resources in a resource pool;
   identifying calling code segments receiving said allocated resources;
   detecting memory leaks by inspecting individual timestamps for said allocated resources to determine whether said allocated resources have become overly idle; and,
   for each allocated resource determined to have become overly idle, reporting an identity of a corresponding one of said calling code segments.

2. The method of claim 1, wherein said identifying step comprises the step of retrieving identities for individual ones of said calling code segments from an associated calling stack when said individual ones of said calling code segments acquire one of said allocated resources.

3. The method of claim 1, further comprising the step of performing said detecting and reporting steps in a separate thread of execution.

4. The method of claim 2, wherein said retrieving step comprises the steps of:
   for calling code segment in which a resource is allocated, inducing a placebo error condition in close proximity to code for allocating said resource; and,
   reading error data from said calling stack produced by said placebo error condition, said error data comprising identity information for said calling code segment.

5. The method of claim 1, further comprising the step of performing said detecting and reporting steps responsive to allocating one of said resources in said resource pool.

6. The method of claim 1, further comprising the step of performing said detecting and reporting steps responsive to an elapsing interval.

7. A memory leak detection and reporting system comprising:
   a resource pool comprising a plurality of allocable resources;
   a pool manager programmed to manage allocation of said allocable resources to calling code segments; and,
   a data store of allocated resources and corresponding identities for calling code segments receiving said allocated resources, wherein the pool manager
    detects memory leaks by inspecting individual timestamps for said allocated resources to determine whether said allocated resources have become overly idle; and,
    for each allocated resource determined to have become overly idle, reports an identity of a corresponding one of said calling code segments to the data store.

8. The system of claim 7, wherein said pool manager comprises:
    a communicative coupling to a call stack; and,
    correlation logic for correlating a calling code segment reference disposed in said call stack to a concurrently allocated one of said allocable resources.

9. The system of claim 7, further comprising a garbage collector coupled to said resource pool.

10. A memory leak detection and reporting method comprising the steps performed by a processor of:
    allocating a resource from a resource pool, time stamping said allocated resource and recording an identity for a calling code segment acquiring said allocated resource;
    updating said time stamp when said allocated resource is accessed;
    inspecting said time stamp to determine if said allocated resource has become overly idle; and,
    if it is determined that said allocated resource has become overly idle, reporting a suspected memory leak in association with said allocated resource and further reporting said recorded identity for said calling code segment which had acquired said allocated resource.

11. The method of claim 10, further comprising the step of performing said inspecting and reporting steps in a separate thread of execution.

12. The method of claim 10, further comprising the steps of performing said allocating, inspecting and reporting steps in a pool manager.

13. The method of claim 10, further comprising the step of performing said inspecting and reporting steps responsive to allocating another resource in said resource pool.

14. The method of claim 10, further comprising the step of performing said inspecting and reporting steps responsive to an elapsing interval.

15. A machine readable storage having stored thereon a computer program for memory leak detection and reporting, the computer program comprising a routine set of instructions which when executed by the machine cause the machine to perform the steps of:
    time stamping allocated ones of resources in a resource pool;
    identifying calling code segments receiving said allocated resources;
    detecting memory leaks by inspecting individual timestamps for said allocated resources to determine whether said allocated resources have become overly idle; and,
    for each allocated resource determined to have become overly idle, reporting an identity of a corresponding one of said calling code segments.

16. The machine readable storage of claim 15, wherein said identifying step comprises the step of retrieving identities for individual ones of said calling code segments from an associated calling stack when said individual ones of said calling code segments acquire one of said allocated resources.

17. The machine readable storage of claim 15, further comprising the step of performing said detecting and reporting steps in a separate thread of execution.

18. The machine readable storage of claim 16, wherein said retrieving step comprises the steps of:
    for calling code segment in which a resource is allocated, inducing a placebo error condition in close proximity to code for allocating said resource; and,
    reading error data from said calling stack produced by said placebo error condition, said error data comprising identity information for said calling code segment.

19. The machine readable storage of claim 15, further comprising the step of performing said detecting and reporting steps responsive to an elapsing interval.

20. A machine readable storage having stored thereon a computer program for memory leak detection and reporting, the computer program comprising a routine set of instructions which when executed by the machine cause the machine to perform the steps of:
    allocating a resource from a resource pool, time stamping said allocated resource and recording an identity for a calling code segment acquiring said allocated resource;
    updating said time stamp when said allocated resource is accessed;
    inspecting said time stamp to determine if said allocated resource has become overly idle; and,
    if it is determined that said allocated resource has become overly idle, reporting a suspected memory leak in association with said allocated resource and further reporting said recorded identity for said calling code segment which had acquired said allocated resource.

* * * * *